(12) United States Patent
Hillebrandt

(10) Patent No.: US 11,319,936 B2
(45) Date of Patent: May 3, 2022

(54) WIND TURBINE AND METHOD OF MAINTAINING A WIND TURBINE

(71) Applicant: Vestas Wind Systems A/S, Aarhus N. (DK)

(72) Inventor: Jesper Hillebrandt, Aarhus N. (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/293,222

(22) PCT Filed: Nov. 6, 2019

(86) PCT No.: PCT/DK2019/050337
§ 371 (c)(1),
(2) Date: May 12, 2021

(87) PCT Pub. No.: WO2020/098889
PCT Pub. Date: May 22, 2020

(65) Prior Publication Data
US 2022/0049684 A1 Feb. 17, 2022

(30) Foreign Application Priority Data
Nov. 14, 2018 (DK) .......................... PA 2018 70746

(51) Int. Cl.
*F03D 80/80* (2016.01)
*F03D 80/60* (2016.01)
*H01F 27/14* (2006.01)

(52) U.S. Cl.
CPC ............. *F03D 80/82* (2016.05); *F03D 80/60* (2016.05); *H01F 27/14* (2013.01); *F05B 2240/85* (2020.08)

(58) Field of Classification Search
CPC .......... F03D 80/82; F03D 80/60; H01F 27/14; F05B 2240/85
See application file for complete search history.

(56) References Cited

U.S. PATENT DOCUMENTS

| 2,639,308 A | 5/1953 | Egger | |
| 2008/0164966 A1* | 7/2008 | Findeisen | ............... F03D 80/00 336/57 |

(Continued)

FOREIGN PATENT DOCUMENTS

| EP | 2565445 A1 | 3/2013 |
| WO | 2012143285 A1 | 10/2012 |

(Continued)

OTHER PUBLICATIONS

Danish Patent and Trademark Office, Search and Examination Report in PA 2018 70746, dated May 8, 2019.

(Continued)

*Primary Examiner* — Viet P Nguyen
(74) *Attorney, Agent, or Firm* — Wood Herron & Evans LLP

(57) ABSTRACT

Wind turbine installation (1) comprising a tower (2), a nacelle (3), —a liquid immersed power electrical device (6) having an expansion vessel (7), an air dehydrating breather (8) comprising a moisture absorbing agent (9), and a conduit (10) fluidly connecting the expansion vessel (7) and the air dehydrating breather (8), wherein the wind turbine installation (1) comprises a barrier (11) separating a restricted zone (12) from a non-restricted zone (13) in said wind turbine installation (1), wherein the electrical device (6) is located in the restricted zone (12), wherein the air dehydrating breather (8) is located in the non-restricted zone (12) and wherein the conduit (10) extends through the barrier (11) and a method of maintaining a wind turbine installation (1).

7 Claims, 4 Drawing Sheets

(56) References Cited

U.S. PATENT DOCUMENTS

2012/0146335 A1   6/2012   Bywaters et al.
2014/0165828 A1   6/2014   Martin et al.

FOREIGN PATENT DOCUMENTS

WO   2015019664 A1   2/2015
WO   2017125236 A1   7/2017

OTHER PUBLICATIONS

European Patent Office, International Search Report and Written Opinion in PCT Application No. PCT/DK2019/050337, dated Feb. 3, 2020.

* cited by examiner

WIND TURBINE AND METHOD OF MAINTAINING A WIND TURBINE

FIELD OF THE INVENTION

The present invention relates to a wind turbine installation and a method of maintaining a wind turbine installation, more specifically to the field of air dehydrating breathers for liquid immersed power electrical devices in wind turbine installations.

BACKGROUND OF THE INVENTION

Power electrical devices, such as power transformers, chokes, converters et cetera, develop heat during operation. In order to remove heat and provide insulation these devices may be immersed into a liquid, such as oil. The temperature of the liquid may vary causing expansion and contraction of its volume. To allow for such changes in volume an expansion vessel is required. The change in liquid volume requires an equal change of air volume in the expansion vessel. Thus, to maintain the same pressure in the system, there will be an exchange of air with the ambient environment. This may introduce humidity in the system when air of higher humidity is drawn into the expansion vessel. In order to avoid the ingress of moisture into the system a dehydrating breather is attached to the air exchange inlet of the expansion tank.

A dehydration breather may comprise a moisture absorbing agent that removes humidity from the air passing through the breather. Moisture absorbing agents may be divided into two groups. Those having automatic regeneration of the moisture absorbing agent and those requiring exchange when saturation of the moisture absorbing agent is approaching.

In installations with high voltage equipment special procedures and training are required for personnel working near such equipment. Moreover, de-energizing the equipment may be required before commencing such operations. Therefore, inspection of the dehydrating breather and replacement of the moisture absorbing agent may require shut down of the plant in which the power electrical device is installed causing lost production and increased service cost.

DESCRIPTION OF THE INVENTION

An object of the invention is to provide a cost-effective solution for liquid immersed power electrical devices in wind turbine installations.

This is achieved with a wind turbine installation according to a first aspect of the invention, the wind turbine installation comprising a tower, a nacelle, a liquid immersed power electrical device having an expansion vessel, an air dehydrating breather comprising a moisture absorbing agent and a conduit fluidly connecting the expansion vessel and the air dehydrating breather. The wind turbine installation comprises a barrier separating a restricted zone from a non-restricted zone in said wind turbine installation. The electrical device is located in the restricted zone. The air dehydrating breather is located in the non-restricted zone. The conduit extends through the barrier.

The restricted zone may be limited only to enclose the power electrical device, such most of the wind turbine installation equipment resides in the non-restricted zone. In this way the power electrical device can remain energized when personnel are working on wind turbine equipment in the non-restricted zone, for example most of the nacelle, tower or associated external housings for electrical devices. The placement of the dehydrating breather in the non-restricted zone therefore does not require personnel to be qualified for working in the proximity of high voltage equipment for performing the action of inspecting and replacing the moisture absorbing agent when required. This also makes it possible to use a less costly non-regenerating moisture absorbing agent. Moreover, costly training of personnel can be avoided.

Moreover, it is not necessary to disconnect the wind turbine installation from the grid. This switching operation can also be costly and time consuming. Thus, further savings on cost and time are achieved with the invention.

Non-limiting examples of power electrical devices are power transformers, chokes, converters et cetera.

Non-limiting examples of expansion vessels are conservator tanks and expansion tanks.

Non-limiting examples of moisture absorbing agents are silica gels and zeolites.

In an embodiment of the wind turbine installation according to the invention, the restricted zone and non-restricted zones are located in the tower.

In an embodiment of the wind turbine installation according to the invention, the restricted zone and non-restricted zones are located in the nacelle.

In an embodiment of the wind turbine installation according to the invention, the wind turbine installation further comprises a housing for the electrical device, wherein the housing is located external to the tower and nacelle, wherein the restricted zone and the non-restricted zones are located in the housing.

The housing can be what is known by the skilled person as a "kiosk". The housing is placed external to the wind turbine, i.e. outside the tower and nacelle.

In an embodiment of the wind turbine installation according to the invention the electrical device is a transformer.

In an embodiment of the wind turbine installation according to the invention the air dehydrating breather comprises a moisture absorbing means, wherein the moisture absorbing means is of a type with no or a finite regeneration capability.

In a second aspect the invention provides a method of maintaining a wind turbine installation, the wind turbine installation comprising a tower, a nacelle, a liquid immersed power electrical device having an expansion vessel, an air dehydrating breather comprising a moisture absorbing agent and a conduit fluidly connecting the expansion vessel and the air dehydrating breather. The wind turbine installation comprises a barrier separating a restricted zone from a non-restricted zone in said wind turbine installation. The electrical device is located in the restricted zone. The air dehydrating breather is located in the non-restricted zone. The conduit extends through the barrier. The method comprises regenerating the dehydrating breather without de-energizing the electrical device.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

In the explanation of the figures, identical or corresponding elements will be provided with the same designations in different figures. Therefore, no explanation of all details may be given in connection with each single figure/embodiment.

DESCRIPTION OF EMBODIMENTS

Figure 1:
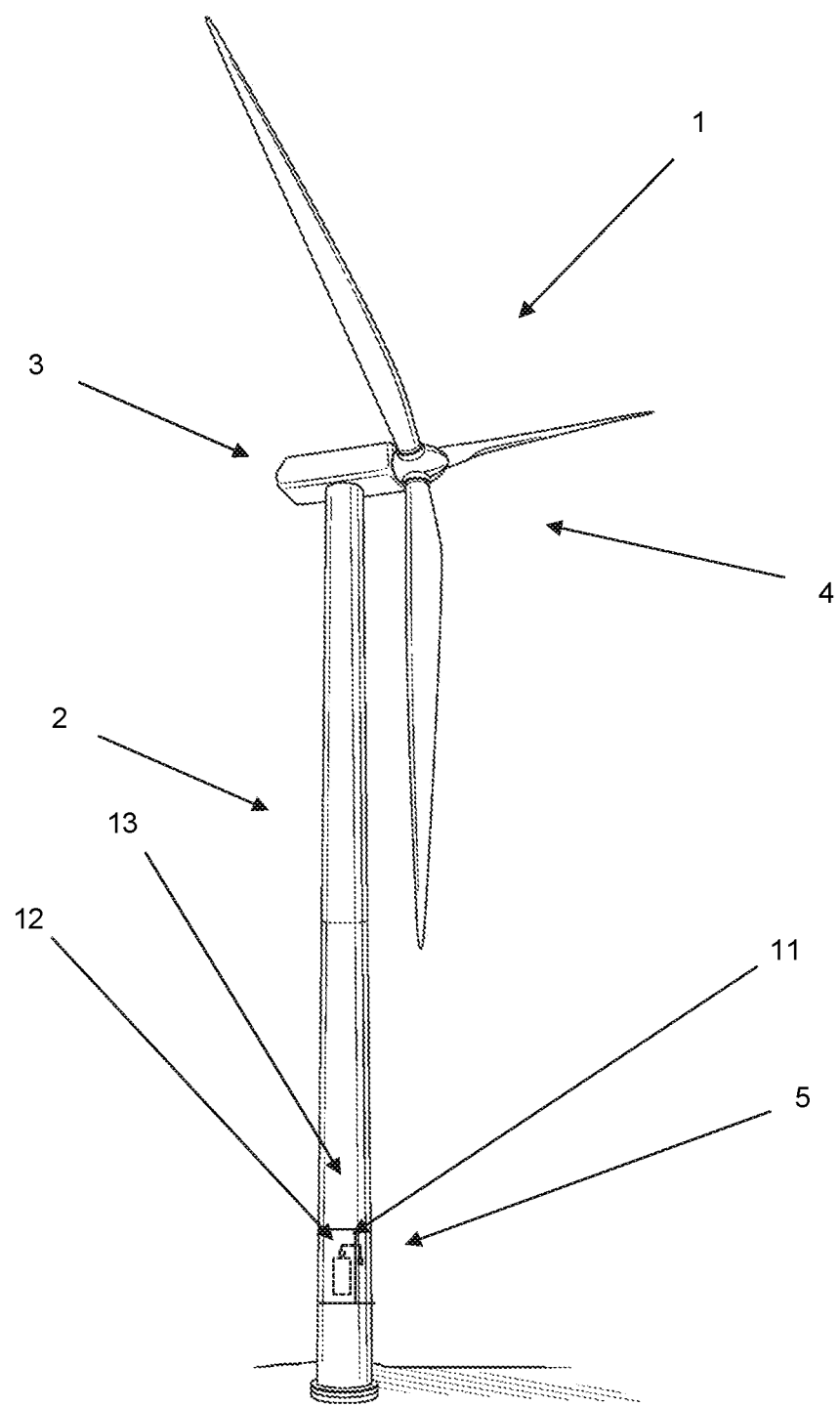
FIG. 1 shows a first embodiment of a wind turbine installation.

FIG. 1 illustrates, in a schematic perspective view, an example of a wind turbine installation 1. The wind turbine installation 1 includes a tower 2, a nacelle 3 disposed at the apex of the tower, and a rotor 4 operatively coupled to a generator housed inside the nacelle 3.

Figure 3:
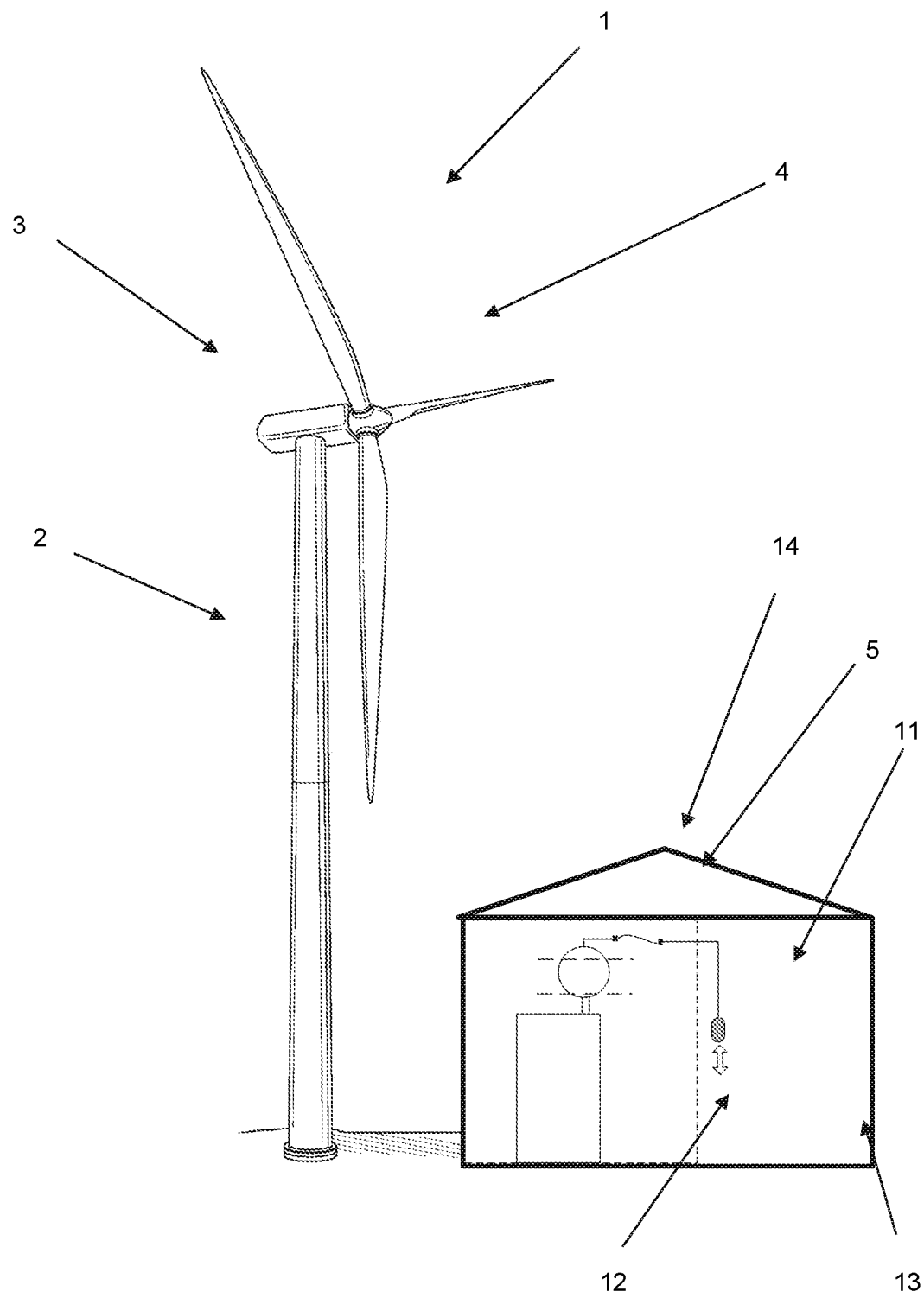
FIG. 3 shows a third embodiment of a wind turbine installation.

The tower 2 houses a high voltage electrical installation 5 according to FIG. 3. A barrier 11 is arranged to separate a restricted zone 12 with high voltage equipment from a non-restricted zone 13 without high voltage equipment. It requires special qualifications for personnel to enter the restricted zone 12.

The barrier 11 is a wall providing access limitation and protecting against electrical, thermal and mechanical hazards. The barrier 11 may include a part of the tower wall or side walls or other parts of the construction, a roof and a floor to completely encapsulate the restricted zone 12.

Figure 2:
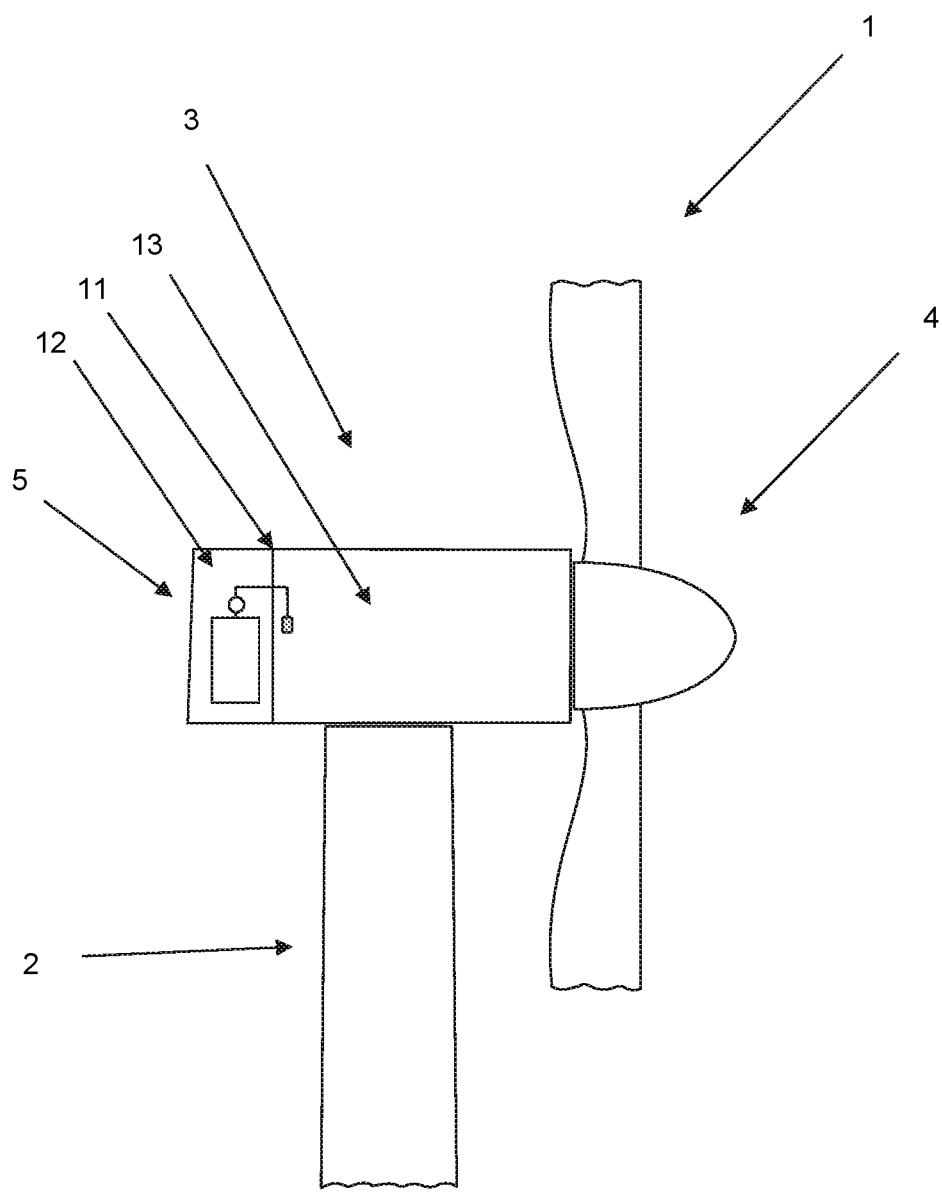
FIG. 2 shows a second embodiment of a wind turbine installation.

FIG. 2 illustrates, in a schematic perspective view, an example of a second embodiment of a wind turbine installation 1. The wind turbine installation 1 includes a tower 2, a nacelle 3 disposed at the apex of the tower, and a rotor 4 operatively coupled to a generator housed inside the nacelle 3.

Figure 4:
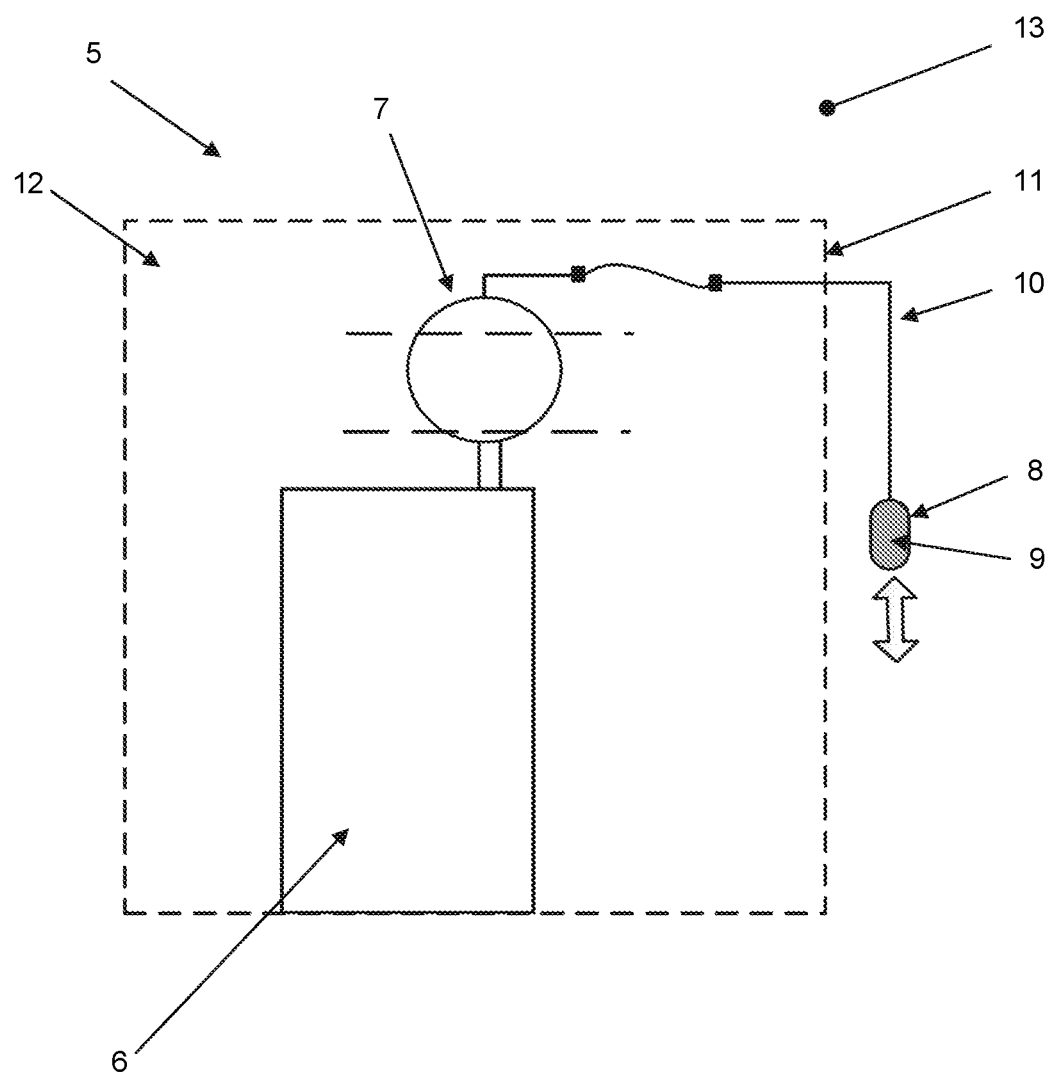
FIG. 4 shows a high voltage electrical device installation.

In this second embodiment, the nacelle 3 houses a high voltage electrical installation 5 according to FIG. 4. In this embodiment the barrier 11 is arranged in the nacelle to separate the restricted zone 12 with high voltage equipment from the non-restricted zone 13 without high voltage equipment.

The barrier 11 in the nacelle 3 may be a dividing wall separating a compartment of the nacelle 3 defined as a restricted zone 12 from the rest of the nacelle 3 defining a non-restricted zone 13.

FIG. 3 illustrates, in a schematic perspective view, an example of a third embodiment of a wind turbine installation 1. The wind turbine installation 1 includes a tower 2, a nacelle 3 disposed at the apex of the tower, and a rotor 4 operatively coupled to a generator housed inside the nacelle 3.

The wind turbine installation 1 further comprises a housing 14 for the electrical device. Such a housing 14 may be known to the skilled person as a "kiosk". The housing 14 is located external to the tower 2 and nacelle 3.

In the housing 14, the restricted zone 12 comprises a high voltage electrical installation 5 according to FIG. 4. The non-restricted zone 13 is also located in the housing 14. A barrier 11 is arranged to separate the restricted zone 12 with high voltage equipment from the non-restricted zone 13 without high voltage equipment.

The barrier 11 in the housing 14 may be a dividing wall separating a compartment of the housing 14 defined as a restricted zone 12 from the rest of the housing 14 defining a non-restricted zone 13.

FIG. 4 shows a schematic drawing of a high voltage electrical installation 5.

The high voltage electrical installation 5 comprises liquid immersed power electrical device 6 that is connected to an expansion vessel 7 that allows thermal expansion of the liquid in the power electrical device 6.

The electrical device 6 is located in the restricted zone 12, which is separated from the non-restricted zone 13 by a barrier 11 indicated by the dotted line that surrounds the electrical device 6.

The air dehydrating breather 8 is located in the non-restricted zone 13. This enables inspection and replacement of the moisture absorbing agent 9.

The expansion vessel 7 is fluidly connected to the air dehydrating breather 8 via a conduit 10. The conduit 10 may be selected among pipes, hoses or other suitable air tight conduit.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A wind turbine installation comprising
    a tower,
    a nacelle,
    a liquid immersed power electrical device having an expansion vessel,
    an air dehydrating breather comprising a moisture absorbing agent, and
    a conduit fluidly connecting the expansion vessel and the air dehydrating breather,
    wherein the wind turbine installation comprises a barrier separating a restricted zone from a non-restricted zone in said wind turbine installation, wherein the electrical device is located in the restricted zone, wherein the air dehydrating breather is located in the non-restricted zone and wherein the conduit extends through the barrier.

2. The wind turbine installation according to claim 1, wherein the restricted zone and non-restricted zones are located in the tower.

3. The wind turbine installation according to claim 1, wherein the restricted zone and non-restricted zones are located in the nacelle.

4. The wind turbine installation according to claim 1, wherein the wind turbine installation further comprises a housing for the electrical device, wherein the housing is located external to the tower and nacelle, wherein the restricted zone and the non-restricted zones are located in the housing.

5. The wind turbine installation according to claim 1, wherein the electrical device is a transformer.

6. The wind turbine installation according to claim 1, wherein the air dehydrating breather comprises a moisture absorbing means, wherein the moisture absorbing means is of a type with no or a finite regeneration capability.

7. A method of maintaining a wind turbine installation, the wind turbine installation comprising
    a tower,
    a nacelle,
    a liquid immersed power electrical device having an expansion vessel,
    an air dehydrating breather comprising a moisture absorbing agent, and a conduit fluidly connecting the expansion vessel and the air dehydrating breather, wherein the wind turbine installation comprises a barrier separating a restricted zone from a non-restricted zone in said wind turbine installation, wherein the electrical device is located in the restricted zone, wherein the air dehydrating breather is located in the non-restricted zone and wherein the conduit extends through the barrier, wherein the method comprises regenerating the dehydrating breather without de-energizing the electrical device.

\* \* \* \* \*